US012559175B1

(12) United States Patent
Klein et al.

(10) Patent No.: US 12,559,175 B1
(45) Date of Patent: Feb. 24, 2026

(54) COMBINATION FRONT AXLE/TURNTABLE WITH INDEPENDENT ELECTRIC DRIVEN WHEEL ENDS

(71) Applicants: Jason M. Klein, Springfield, MO (US); Kevin C. Schlack, Ozark, MO (US)

(72) Inventors: Jason M. Klein, Springfield, MO (US); Kevin C. Schlack, Ozark, MO (US)

( * ) Notice: Subject to any disclaimer, the term of this patent is extended or adjusted under 35 U.S.C. 154(b) by 839 days.

(21) Appl. No.: 17/742,732

(22) Filed: May 12, 2022

Related U.S. Application Data

(60) Provisional application No. 63/187,502, filed on May 12, 2021.

(51) Int. Cl.
  *B62D 13/02* (2006.01)
  *B62D 5/04* (2006.01)
  *B62D 63/08* (2006.01)

(52) U.S. Cl.
  CPC ........... *B62D 13/02* (2013.01); *B62D 5/0403* (2013.01); *B62D 5/046* (2013.01); *B62D 63/08* (2013.01)

(58) Field of Classification Search
  CPC ........ B62D 5/04; B62D 5/0418; B62D 5/046; B62D 7/02; B62D 7/023; B62D 7/04; B62D 11/02; B62D 11/04; B60G 2300/36; B60G 2300/40; B60G 2300/402
  USPC ........................................ 180/419
  See application file for complete search history.

(56) References Cited

U.S. PATENT DOCUMENTS

| | | | | |
|---|---|---|---|---|
| 2,906,358 A | * | 9/1959 | Tucker, Sr. .......... | B60K 17/358 |
| | | | | 180/209 |
| 6,354,388 B1 | * | 3/2002 | Teal ..................... | B62D 11/183 |
| | | | | 180/6.66 |
| 10,589,797 B2 | | 3/2020 | Milton et al. .......... | B60G 13/10 |
| 2007/0017715 A1 | * | 1/2007 | McCann ............ | B60G 17/0523 |
| | | | | 180/290 |
| 2012/0248728 A1 | * | 10/2012 | Horton ................. | B62D 53/068 |
| | | | | 280/149.2 |
| 2019/0300048 A1 | | 10/2019 | Kaufman ................. | B62D 5/04 |

FOREIGN PATENT DOCUMENTS

DE        102017126087 A1 *  5/2019

* cited by examiner

*Primary Examiner* — Valentin Neacsu
*Assistant Examiner* — Tyler Jay Stanley
(74) *Attorney, Agent, or Firm* — Jonathan A. Bay

(57) ABSTRACT

A front-wheel drive electric truck cab has a front axle/turntable with independent electric motor driven wheel ends. The front axle/turntable is able to execute various extreme maneuvers including a 'zero-cab-turn, pivot-in-place' maneuver at least through about a 90° pivot from a straight ahead heading. For example, left wheel end is going to be accelerated smoothly to two miles per hour rearward (not forward) speed at the same time, in unison but independently, the right wheel end is going to be accelerated smoothly to two miles per hour in forward speed. Thus, the left and right wheel ends are being driven in exactly opposite directions. The following happens. The cab does not move: —not forward, not backward; nor in a forward or backward turn. The turntable/front suspension assembly pivots in place counterclockwise about its central vertical axis (at least through about a 90° pivot from a straight ahead heading).

8 Claims, 11 Drawing Sheets

34,000 lbs. 2 AXLE / 4 ft.
CAPACITY PER FBL 40,000 lbs. 2 AXLE / 10 ft.
CAPACITY PER FBL

COMBINATION FRONT AXLE/TURNTABLE WITH INDEPENDENT ELECTRIC DRIVEN WHEEL ENDS

CROSS-REFERENCE TO PROVISIONAL APPLICATION(S)

This application claims the benefit of U.S. Provisional Application No. 63/187,502, filed May 12, 2021. The foregoing patent disclosure(s) is (are) incorporated herein by this reference thereto.

BACKGROUND AND SUMMARY OF THE INVENTION

The invention relates to heavy duty vehicle front axle suspensions and, more particularly, to a combination front axle/turntable further enhanced by independent electric motor driven wheel ends.

Conventional heavy duty vehicles include without limitation what the Federal Highway Administration refers to as commercial motor vehicles (CMV's), but might more popularly be recognized as what are referred to as rigs of over-the-road semi-tractors that tow (over-the road) semi-trailers, including semi-trailer vans. Such a rig is shown by for example and without limitation FIG. 11.

FIG. 8 is a top plan schematic view of the axle arrangement of the semi-tractor 112 and trailer 114 of FIG. 11 (reference numerals not inserted in FIG. 11), including showing a conventional front steering axle arrangement 120 known as "Ackerman" steering 120.

Ackerman steering 120 typically comprises a front steering axle 122 that is a rigid beam. Ackerman steering 120 was invented back when horse pulled carriages were the norm. Ackerman steering 120 was intended to reduce the packaging envelope that the old turntable carriage front axle took as the horses turned. The axle and wheels of the carriage had to go under the carriage causing it to be high or in front adding to the cost of the construction. With horses in front of the carriage pulling the vehicle, the maximum wheel cut (cramp) angle turning angle maximum was plentifully wide and not effected as much when designers changed over to an Ackerman-type steering mechanism.

To turn to FIG. 8, Ackerman steering 120 is accomplished with each side of the steering dependent on the other side by being connected through linkages 126 and 128 so that the inside wheel/tire 132 turns different than the outside wheel/tire 132. The linkages 126 and 128 are connected to a steering knuckle 134 at each wheel end that turns the wheel/tire 132 to facilitate steering. These steering knuckles 134 have bearings attached to a center king pin that controls the steering angles of the wheel/tire 132. The king pin is preferably adjusted to a target caster angle, target toe-in angle and target camber angle to obtain the best steering properties and eliminate "bump steer." Ackerman steering 120 requires suspension controls to maintain these steering properties through the jounce and rebound of the suspension.

Also, due to the friction on the tires 132 of Ackerman steering 120, the tire size is less than or equal to the drive tire 136 size to facilitate the Ackerman steering 120. Again, the front tire 132 sizes are smaller than the semi-tractor 112's drive tires 136 to facilitate Ackerman steering 120. To accomplish steer-by-wire with Ackerman steering (not shown), extra motors have to be added to the already complicated steering tie rod mechanism or steering knuckle (see U.S. Patent Publication No. 2019/0300048—Telsa, Inc).

It is an object of the invention to improve vehicle performance by replacing Ackerman steering 120 with a combination front axle/turntable 200 in accordance with the invention that has independent electric motor driven wheel ends 204 and 206 in accordance with the invention.

Vehicle Performance can be Improved Along a Number of Factors, Including:

A—widening the angle of maximum wheel cut;

B—transforming the front axle to becoming a driven axle;

C—reducing the number of axles to reduce rolling tire resistance; and

D—simplifying implementation of a driving by wire system.

A. Widening the Angle of Maximum Wheel Cut.

Ackerman-style front steering axles 122 can accommodate an inside wheel cut angle of maybe up to 55° to 60° to achieve a tight cramp angle turning. The wheel cut of Ackerman steering 120 means it is limited by the geometry of tie rods 128 and clearances with tires 132 and other components. Also the side-slip from a passive front axle 122 can reduce the cramp angle as the front axle 122 migrates out of the turn angle due to the side-slip on the tires.

It is another object of the invention to replace Ackerman steering 120 with a combination front axle/turntable 200 in accordance with the invention that has independent electric motor driven wheel ends 204 and 206 in accordance with the invention for widening the angle of maximum wheel cut.

The following two examples (I and II below) will show the extremes of wheel cut functionality for the combination front axle/turntable 200 in accordance with the invention that has independent electric motor driven wheel ends 204 and 206 in accordance with the invention.

Example I. With reference to FIG. 2A, assume a vehicle aligned on a forward heading 208. Next, assume the left and right wheel ends 204 and 206 are going to be spun by their respective independent electric drive motors 210 and 212 to accelerate smoothly in unison (but independently) to a forward speed corresponding to two miles per hour. What will be achieved at the end is that, the front tires 204T and 206T are traveling forward at two miles per hour. These driven front tires 204T and 206T traveling at two miles per hour will propel the turntable/front suspension assembly 200 forward at two miles per hour. Likewise, the whole vehicle is towed/propelled at two miles per hour by the turntable/front suspension assembly 200.

So far, this is just simple forward motion.

Example II. With reference to FIG. 2B, again assume a vehicle aligned on a forward heading 208. Except with this example, the left wheel end 204's respective electric drive motor 210 is going to spin and accelerate smoothly the left wheel end 204 to a corresponding two miles per hour rearward (not forward) speed. In unison, but independently, the right wheel end 206's electric drive motor 212 is going to spin and accelerate smoothly the right wheel end 206 to a corresponding two miles per hour in forward speed. The left and right wheel ends 204 and 206 are being driven in exactly opposite directions. The following happens.

(i) The cab 214 does not move: —not forward, not backward; nor in a forward turn, or else in a backward turn.

(ii) The turntable/front suspension assembly 200 pivots in place counterclockwise about its central vertical axis 216. The central vertical axis 216 is stationary. That is, the central vertical axis 216 intersects the ground at a given point. It stays on that point. The central vertical axis 216 does not translate in any direction. The turntable/front suspension assembly 200 just pivots in place, like a turret on a tank.

Again, FIG. 2B shows that the turntable/front suspension assembly 200 is capable of executing a 'zero-cab-turn, pivot-in-place' maneuver at least through about a 90° pivot from straight ahead. But the ability to do so 90° clockwise and counterclockwise from straight ahead 208 is plenty.

With adjustments to the differential acceleration and spinning speeds of the left and right turning wheel ends 204 and 206, a wide variety of maneuvers can be achieved. Two examples of such other maneuvers include turns by the cab 214 which tow the trailer 218 and look conventional from an Ackerman steering 120 standpoint (eg., FIG. 5) to a controlled jack-knife maneuver where the cab 214 pivots about an axis through the fifth wheel 220 and gets perpendicular to the trailer 218 all the while the trailer 218 rests stationary.

B. Transforming the Front Axle to Becoming a Driven Axle.

Ackerman-style steering design 120 does not readily facilitate a front steering axle to also becoming a driven axle to pull the load (and not shown). Because of Ackerman steering 120, the driving force to each side would not be independent but would be (would have to be or should have to be) synchronized.

With Ackerman-style steering design 120, a driven front steering axle (not shown) becomes a complicated mechanism with U-joints to accommodate not only the drive axle but also the turning of the steering knuckle.

And because of the foregoing, the tire size width for an Ackerman-style steering design, a driven front steering axle cannot be as wide of a tire patch as can be on a non-steering driven axle 136. The general equation (either mandated by the Code or Federal Regulations or else otherwise adopted as an industry standard) is 500 pounds of tire load (or carrying) capacity for each inch of tire width. On heavy trucks, driven axles 136 have dual or wide base tires while steer axles 122 have single tires that are limited in width.

It is an additional object of the invention to replace front axle Ackerman steering 120 with a combination front axle/turntable 200 in accordance with the invention that has independent electric motor driven wheel ends 204 and 206 in accordance with the invention, and which can execute 'zero-cab-turn, pivot-in-place' maneuvers through about a 90° pivot from straight ahead. That way, current narrow steering tires 132 can be replaced with wide-base or dual sets of drive tires 204T and 206T with a wider contact patch and thereby achieve increased load capacities over conventional front steer axles 122.

C. Reducing the Number of Axles to Reduce Rolling Tire Resistance.

To continue with comments made at the end of the last section, conventional front steering axles 122, with few exceptions, are loaded lighter than the rear driven axle 132 (or axles, see FIG. 11) as well as rear dead axles 142 (see FIG. 8). This is done to increase traction at the drive tires 136 and to reduce side-slip forces on the steer axle tires 132 that cause tire wear. This is especially predominant in the class 6 to class 9 truck market.

The Federal Highway Administration has the responsibility for governing Federal weight-limit weight-ceilings for various characteristics of commercial motor vehicles (CMV's) such as:

Gross Vehicle Weight Rating (GVWR),
per axle weight rating,
two or more axles weight rating, and so on.

The controlling Federal Highway Administration specification is known as the Federal Bridge Gross Weight Formula Rule (FBGWF Rule).

This rule is formally codified in the Code of Federal Regulations at 23 C.F.R. § 658.17. This code section begins with sub-sections (a) and (b).

(a) The provisions of the section are applicable to the National System of Interstate and Defense Highways and reasonable access thereto.

(b) The maximum gross vehicle weight shall be 80,000 pounds except where lower gross vehicle weight is dictated by the bridge formula.

So analysis must be undertaken to determine if any commercial motor vehicle (CMV) falls in the category " . . . where lower gross vehicle weight is dictated by the bridge formula."

Because of the current Federal Bridge Gross Weight Formula Rule (FBGWF Rule), most front steering axles of a class 8 truck may only carry 12,000 to 15,000 pounds when, lawfully, the class 8 truck may be able to carry up to 20,000 pounds pursuant to the (FBGWF Rule) and its truck class registration.

This result of this implication means that other axles of the vehicle have to carry more weight to get to maximum vehicle capacity per 23 C.F.R. § 658.17(b) (80,000 pounds) and usually leads to more axles on the vehicle than legally required. More axles is more tires to the ground. More tires to the ground means greater rolling resistance. Higher rolling resistance of the tires reduces the efficiency of the power to the vehicle driven means.

Section 658.17, Title 23 Code of Federal Regulations continues through to sub-section (e) as follows.

(c) The maximum gross weight upon any one axle, including any one axle of a group of axles, or a vehicle is 20,000 pounds.

(d) The maximum gross weight on tandem axles is 34,000 pounds.

(e) No vehicle or combination of vehicles shall be moved or operated on any Interstate highway when the gross weight on two or more consecutive axles exceeds the limitations prescribed by the following formula, referred to as the Bridge Gross Weight Formula:

$$W=500(LN/(N-1)+12N+36)$$

except that two consecutive sets of tandem axles may carry a gross load of 34,000 pounds each if the overall distance between the first and last axle is 36 feet or more. In no case shall the total gross weight of a vehicle exceed 80,000 pounds.

In the Foregoing Federal Bridge Gross Weight Formula Rule,

W=the maximum weight in pounds that can be carried on a group of two or more axles to the nearest 500 pounds, L=spacing in feet between the outer axles of any two or more consecutive axles, and N=number of axles being considered.

FIG. 11 provides a side schematic view of a conventional commercial motor vehicle with five axles and a Gross Vehicle Weight of 80,000 pounds, showing the values for the various quantities filled in.

Given the foregoing, it is moreover an additional object of the invention to reduce the rolling resistance of the tires as another way of improving vehicle performance.

D—Simplifying Implementation of a Driving by Wire System.

It is a further object of the invention to improve vehicle performance by replacing Ackerman steering 120 with a combination front axle/turntable 200 in accordance with the invention that has independent electric motor driven wheel ends 204 and 206 in accordance with the invention that drives, including steers, by wire 222 and 224.

It is more preferred still if the steering and driving controls 222 and 224 are transmitted by radio transmissions to the front axle/turntable in accordance with the invention that has independent electric motor driven wheel ends 204 and 206 in accordance with the invention. That is, the helm of the cab 214 would be equipped with an outer controller 222 which would receive steering and driving inputs. The front axle/turntable 200 in accordance with the invention (that has independent electric motor driven wheel ends 204 and 206 in accordance with the invention) would be equipped with an inner controller 224. The outer and inner controllers 222 and 224 would communication with each other over remote transmission links including for example and without limitation radio frequencies. The inner controller 224 would translate the outer controller 222's instructions into control signals for motor 210 and 212 spin direction and speed.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

Figures 11, 12, 13:
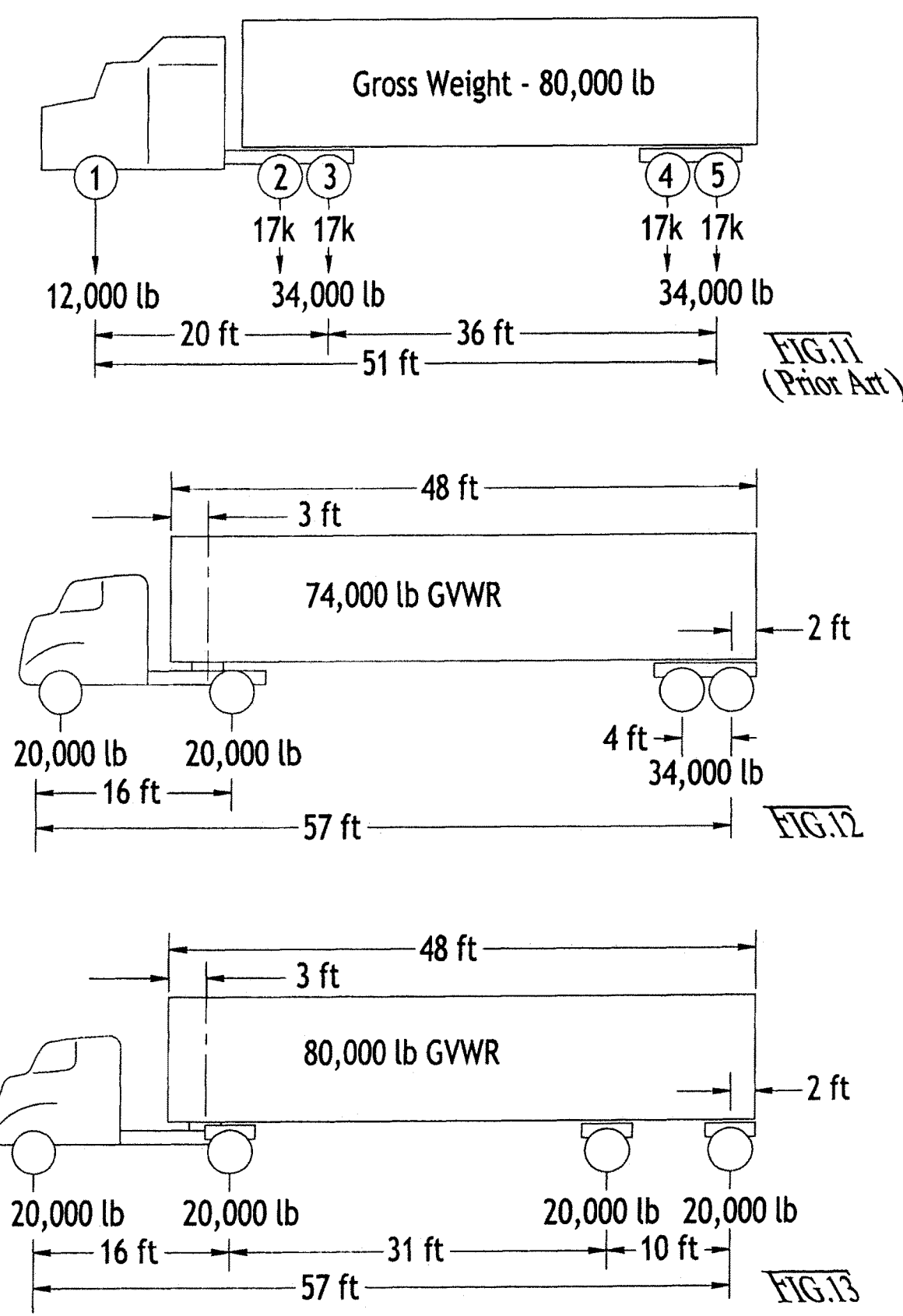
Figures 14A, 14B:
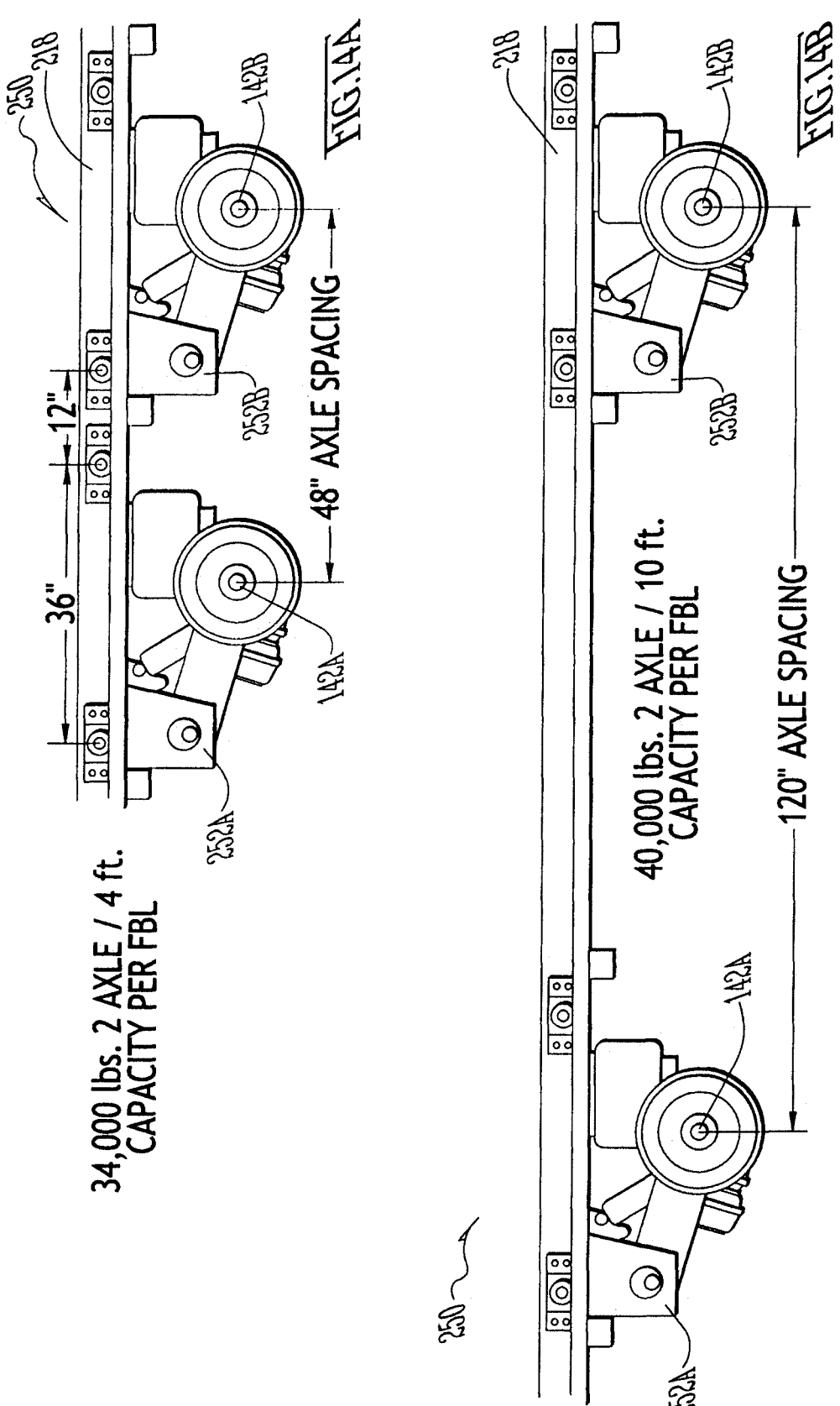

the right-side independent electric motor driven wheel end can be spun by its independent electric drive motor to spin the right front tire reversibly and independently in clockwise and counterclockwise directions on a horizontal axis; and the combination front axle/turntable can be 'horsed' around (led by its nose) to pivot about a vertical axis of symmetry to follow whatever compass point is set by the left and right wheel sets;

FIG. 11 is a schematic side elevation view of commercial motor vehicle (CMV) semi-tractor trailer rig in accordance with the prior art showing the values for weights and length-spacings in accordance with the Federal Bridge Gross Weight Formula Rule (FBGWF Rule) (23 C.F.R. § 658.17) for a prior art five-axle vehicle with 12,000 pounds loaded on its non-driven front axle;

FIG. 12 is a schematic side elevation view comparable to FIG. 11 and showing a commercial motor vehicle (CMV) semi-tractor trailer rig with a cab enhanced by the front axle/turntable in accordance with the invention that has independent electric motor driven wheel ends in accordance with the invention, showing a configuration of four axles with a front driven axle and three dead axles, where the rearmost two axles are bunched together, and further showing the values for weights and length-spacings in accordance with the Federal Bridge Gross Weight Formula Rule (FBGWF Rule) (23 C.F.R. § 658.17);

FIG. 13 is a schematic side elevation view comparable to FIGS. 11 and 12, except showing the commercial motor vehicle (CMV) semi-tractor trailer rig with a cab enhanced by the front axle/turntable in accordance with the invention that has independent electric motor driven wheel ends in accordance with the invention, except showing a configuration of with the four axles differently spaced on an optimization scheme to get to the maximum Gross Vehicle Weight Rating (GVWR) under the Federal Bridge Gross Weight Formula Rule (FBGWF Rule) (23 C.F.R. § 658.17), which is 80,000 pounds;

FIG. 14A is a side elevation view of a flexible spread-adjusting sliding independent bogie system in accordance with the invention for a pair of rear trailer axles the axles can be split or re-joined together anywhere on the trailer under-carriage rail system, wherein the axles are shown in a relatively joined spread at four feet apart; and FIG. 14B is a side elevation view comparable to FIG. 14A except showing the rear axles split apart to a ten foot spread.

DETAILED DESCRIPTION OF THE PREFERRED EMBODIMENTS

FIGS. 1-7 and 9-10 show a front-wheel drive electric-motor drive truck cab 214 in accordance with the invention that has a front axle/turntable 200 in accordance with the invention with independent electric motor driven wheel ends 204 and 206 in accordance with the invention.

Figure 6:
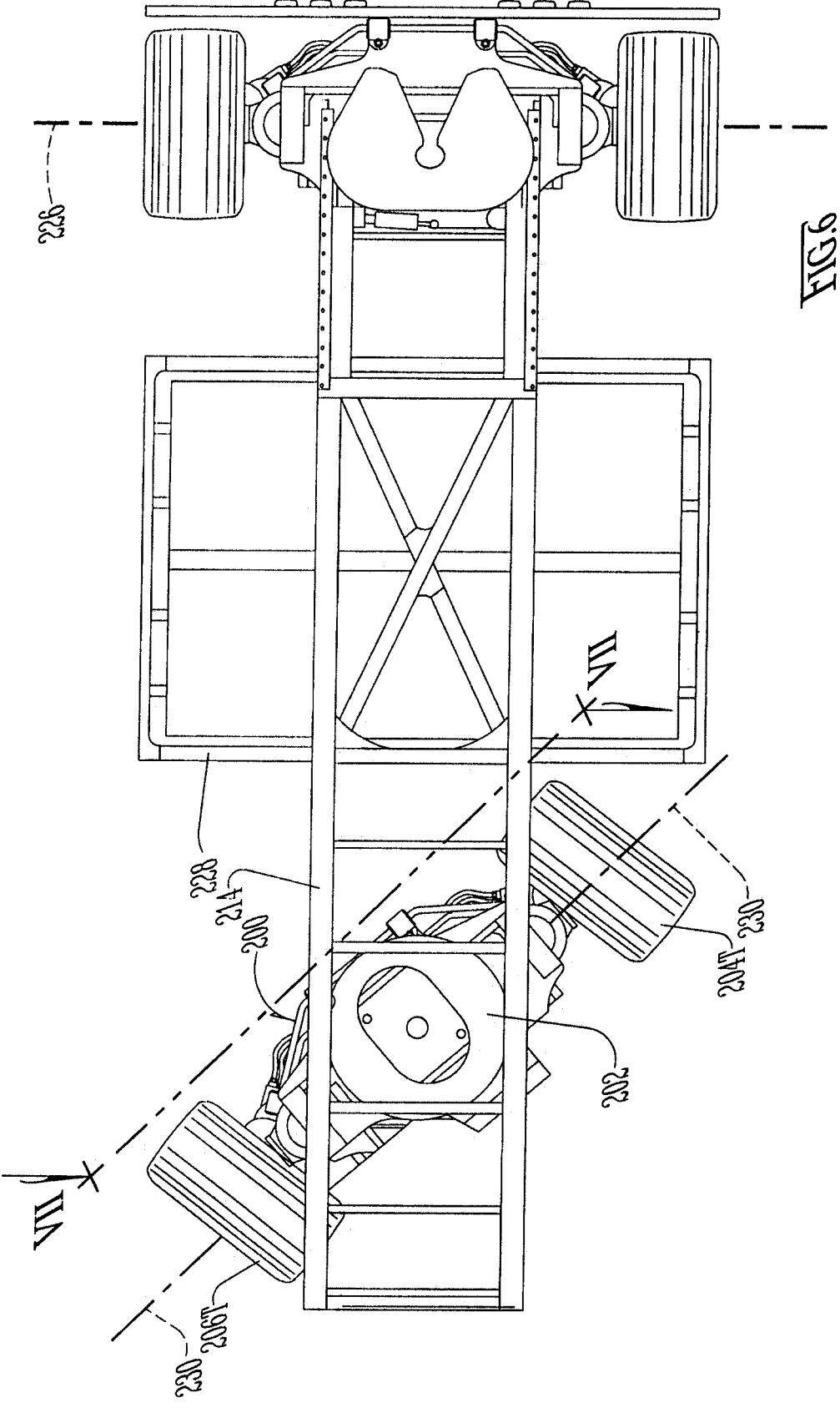
FIG. 6 is a enlarged-scale top plan view of detail VI-VI in FIG. 5, with some of the schematically-indicated structure shown previously now shown in some increasing amount of mechanical detail.
Figure 7:
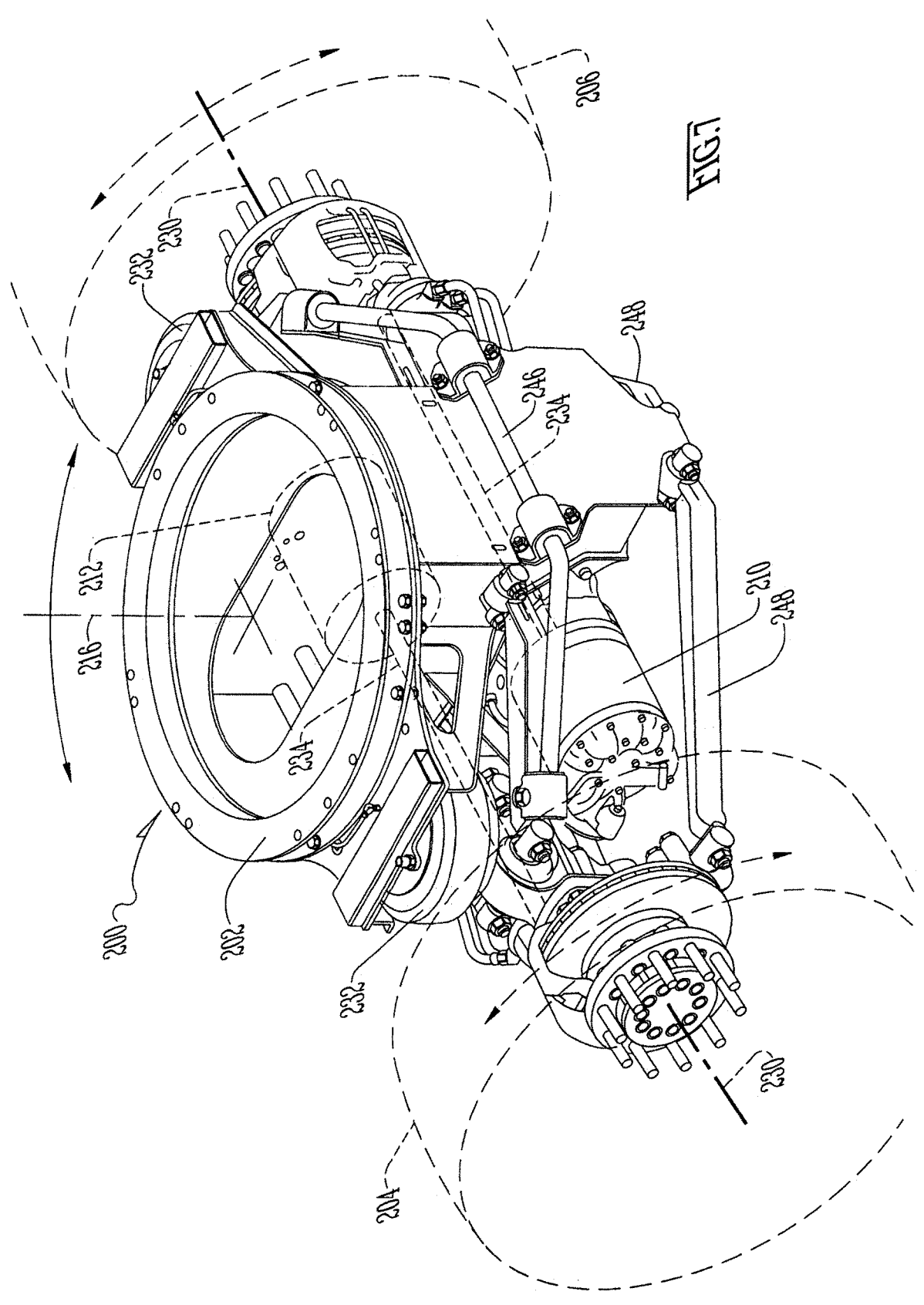
FIG. 7 is a enlarged-scale top perspective taken in the direction of arrows VII-VII in FIG. 6, with more of the sketchily-shown structure shown previously shown in some increasing amount of mechanical detail.
Figures 8, 9:
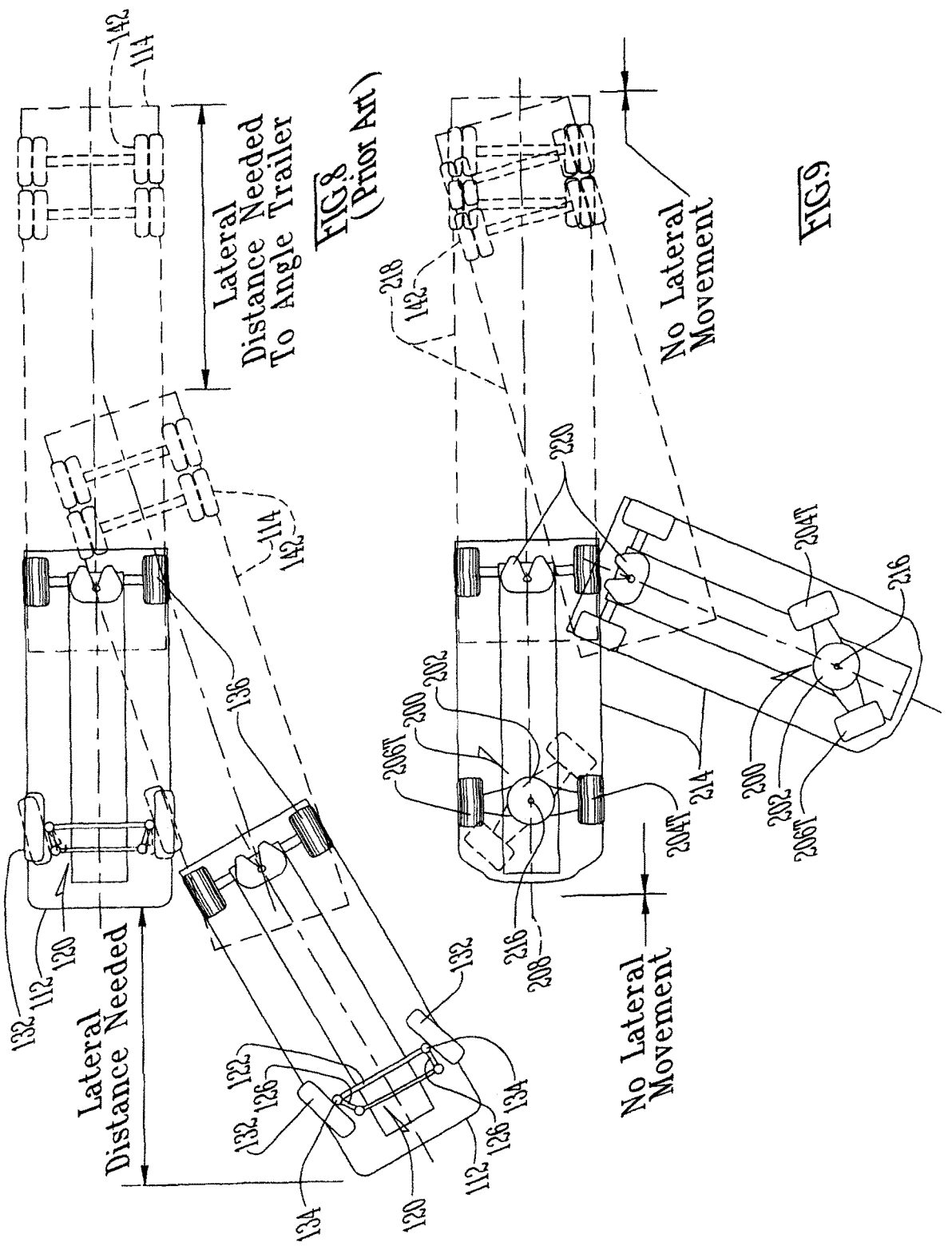
FIG. 8 is a schematic top plan view in accordance with the prior art, and comparable to FIG. 5 except showing the axle arrangement of the prior art semi-tractor and trailer of FIG. 11, including a conventional front steering axle arrangement known as "Ackerman" steering, executing a back-in docking maneuver to a loading dock.
FIG. 9 is a schematic top plan view comparable to FIGS. 5 and 8, showing the combination front axle/turntable in accordance with the invention that has independent electric motor driven wheel ends in accordance with the invention executing about the same back-in docking maneuver to a loading dock as the prior art semi-tractor and trailer of FIG. 8, to comparisons between maneuverability options.
Figure 10:
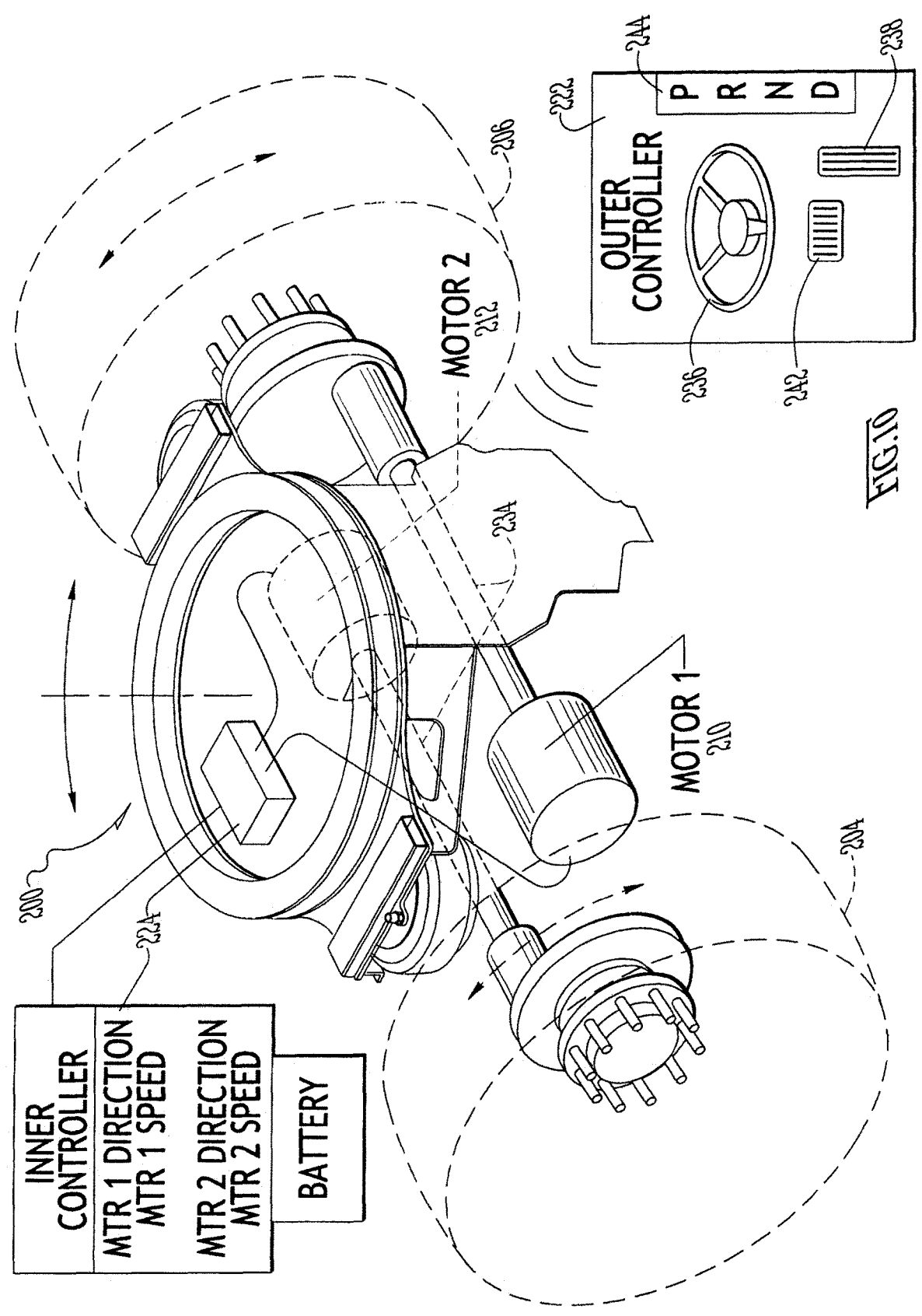
FIG. 10 is a perspective view comparable to FIG. 7, except with less mechanical detail, to better show the main vertical pivot axis and the pair of diametrically opposed drive axes that enable this combination front axle/turntable in accordance with the invention that has independent electric motor driven wheel ends in accordance with the invention to execute such extreme maneuvers including without limitation, wherein on level ground: — the left-side independent electric motor driven wheel end can be spun by its independent electric drive motor to spin the left front tire reversibly and independently in clockwise and counterclockwise directions on a horizontal axis.

FIGS. 6, 7 and 10 show the turntable suspension 200 and a vehicle chassis 214 with tires 204T and 206T. The rear axle 226 may be driven for 4×4 vehicle or non-driven for 4×2 vehicle. The battery pack 228 is housed inside a crash resistance frame for thirty mile per hour collision, weighs about eight thousand pounds, and gets about eight hours of duty. The front axle 230 is mounted on a turntable 202 for active drive steering of the vehicle 214 and is shown with an independent suspension. The axle 230 can be a rigid or solid axle type.

Figure 1:
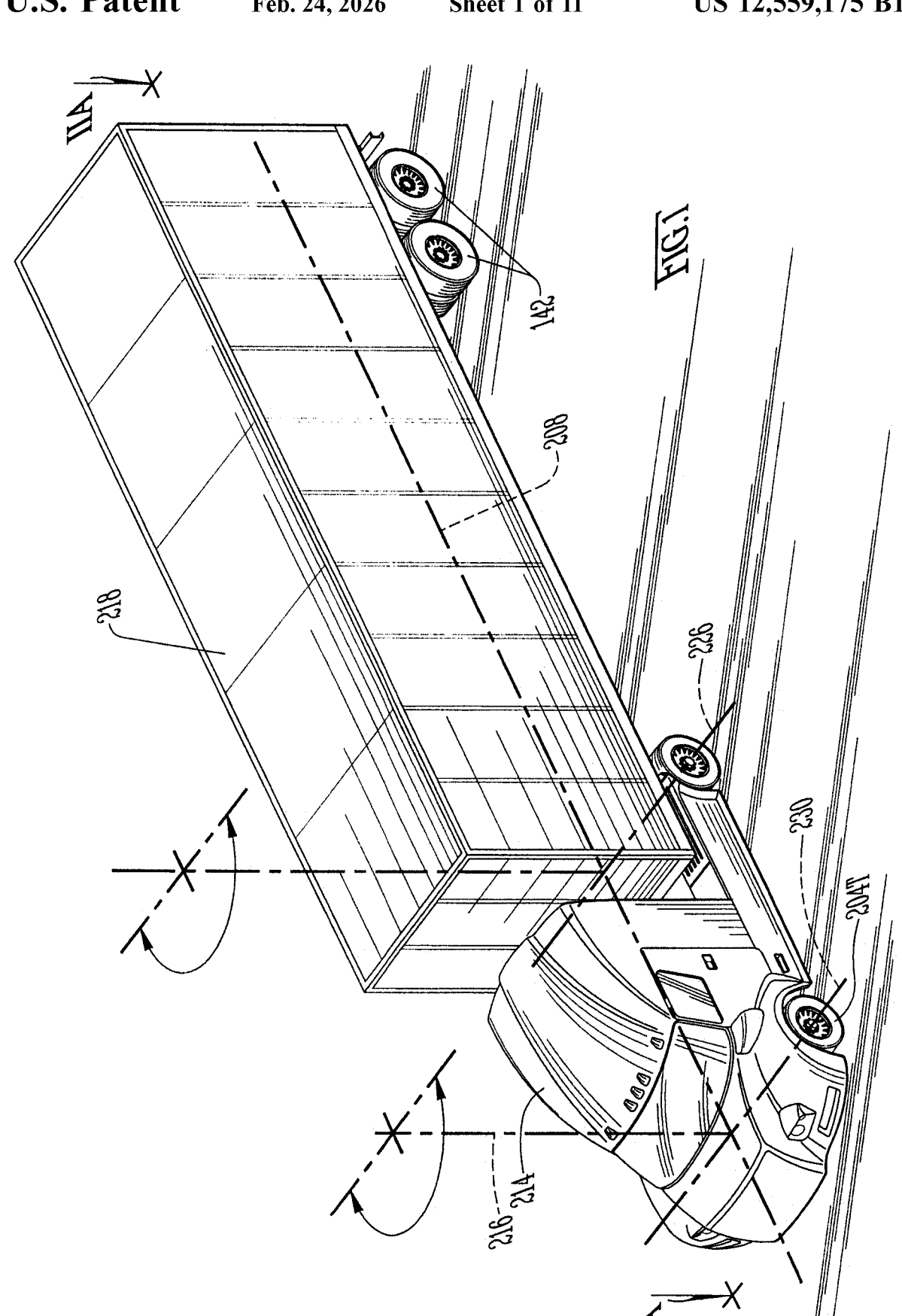
FIG. 1 is a perspective view of a commercial motor vehicle (CMV) provided with a combination front axle/turntable in accordance with the invention that has independent electric motor driven wheel ends in accordance with the invention.
Figure 2:
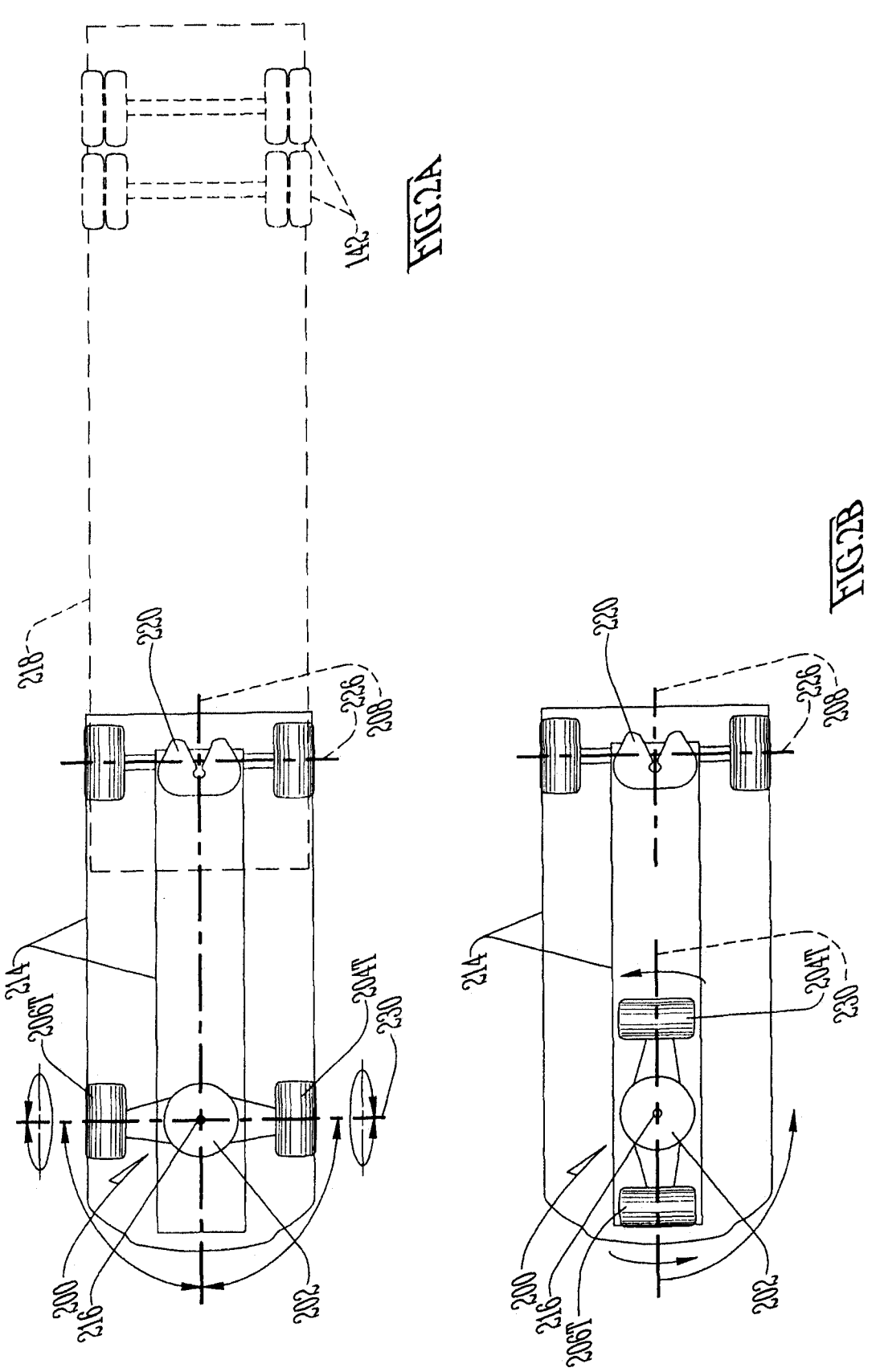
FIG. 2A is a schematic top plan view taken along line II-II in FIG. 1.
FIG. 2B is a schematic top plan view comparable to FIG. 2A except after the combination front axle/turntable in accordance with the invention that has independent electric motor driven wheel ends has done the following: —the combination front axle/turntable has executed a 'zero-cab-turn, pivot-in-place' maneuver at least through about a 90° pivot counterclockwise from straight ahead.
Figure 3:
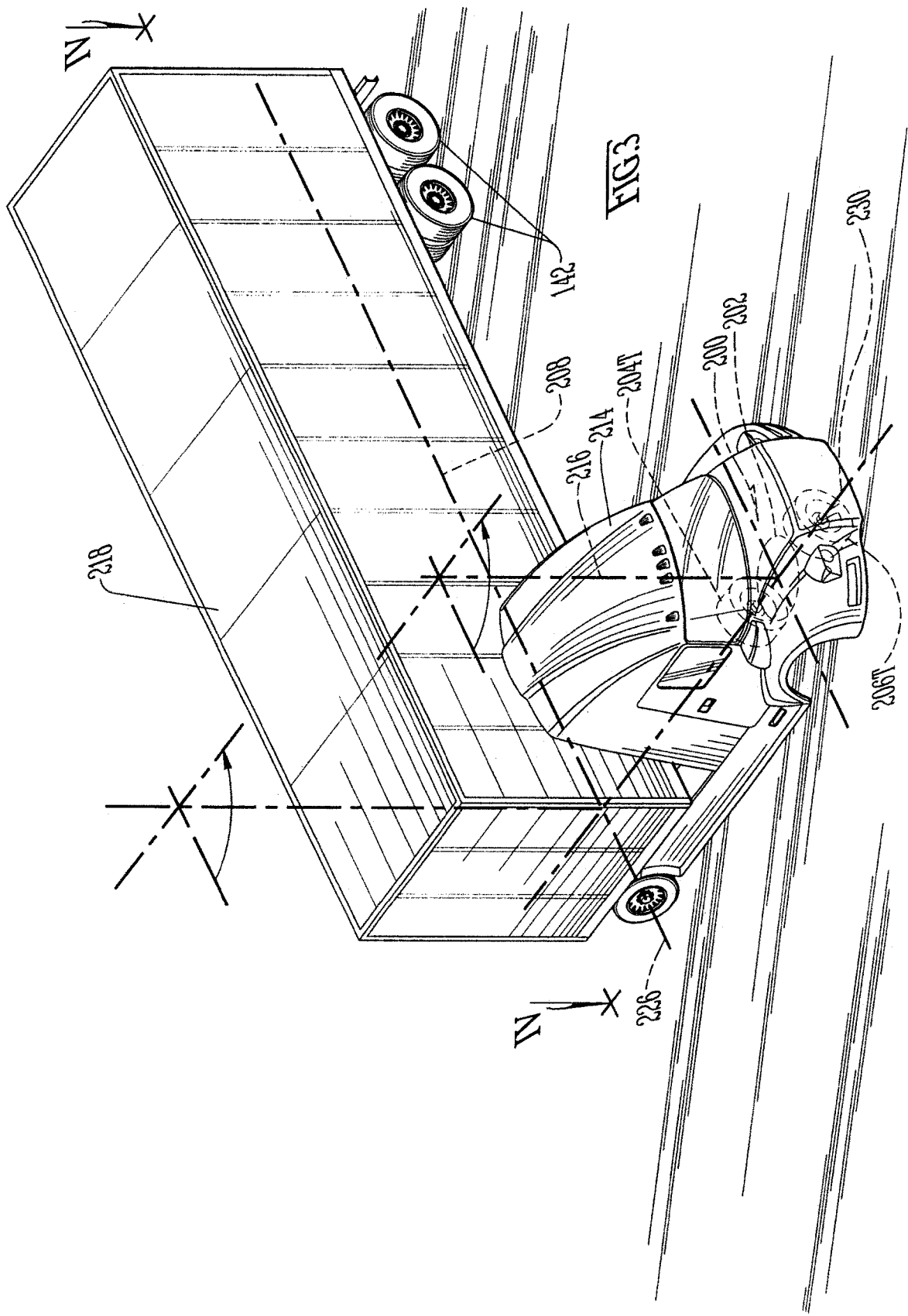
FIG. 3 is a perspective view comparable to FIG. 1 except showing where the cab has executed a controlled jack-knife maneuver where the cab pivots about an axis through the fifth wheel and gets perpendicular to the trailer, all the while during that maneuver the trailer remains parked motionless.
Figure 4:
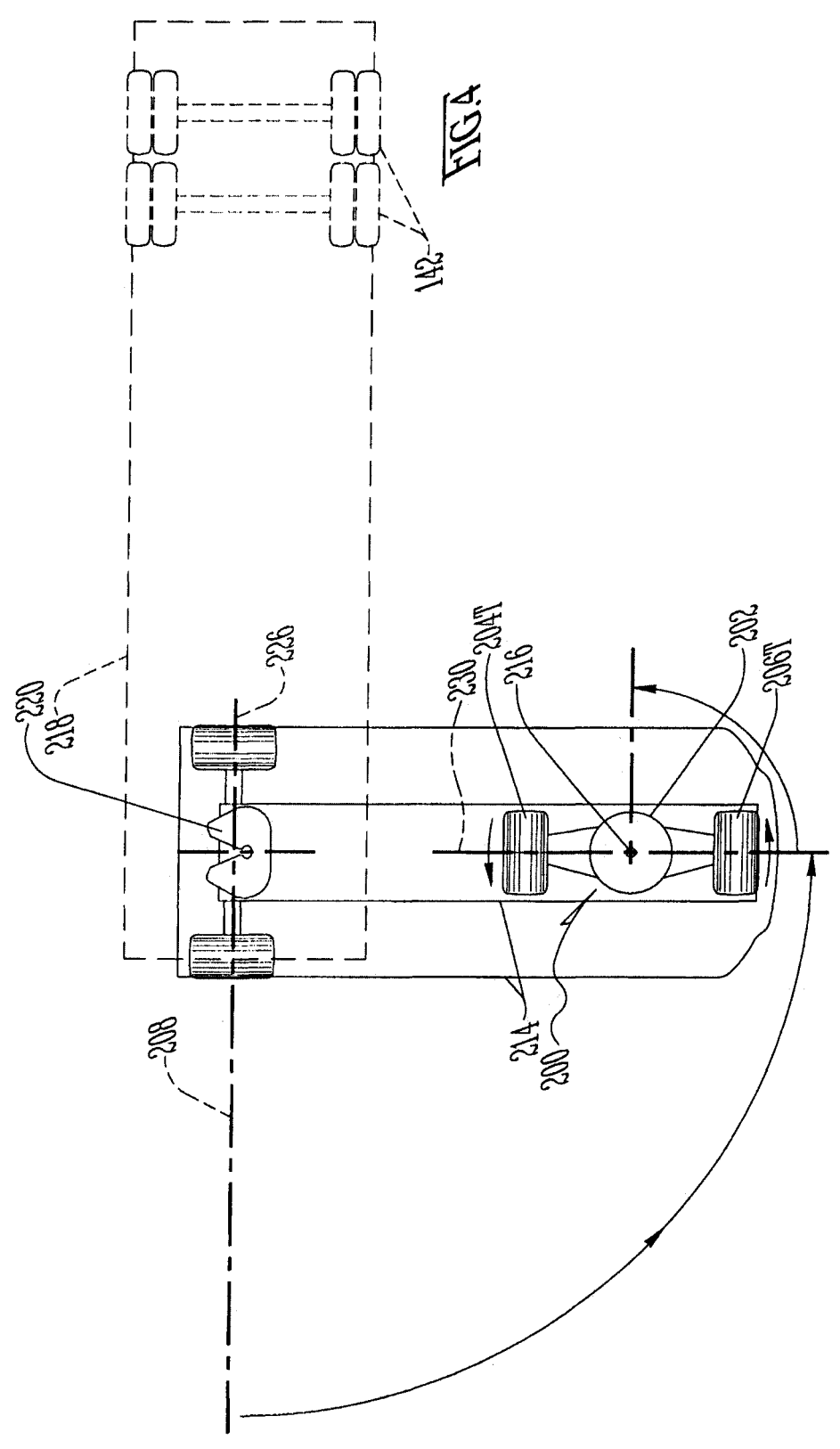
FIG. 4 is a schematic top plan view taken along line IV-IV in FIG. 3.
Figure 5:
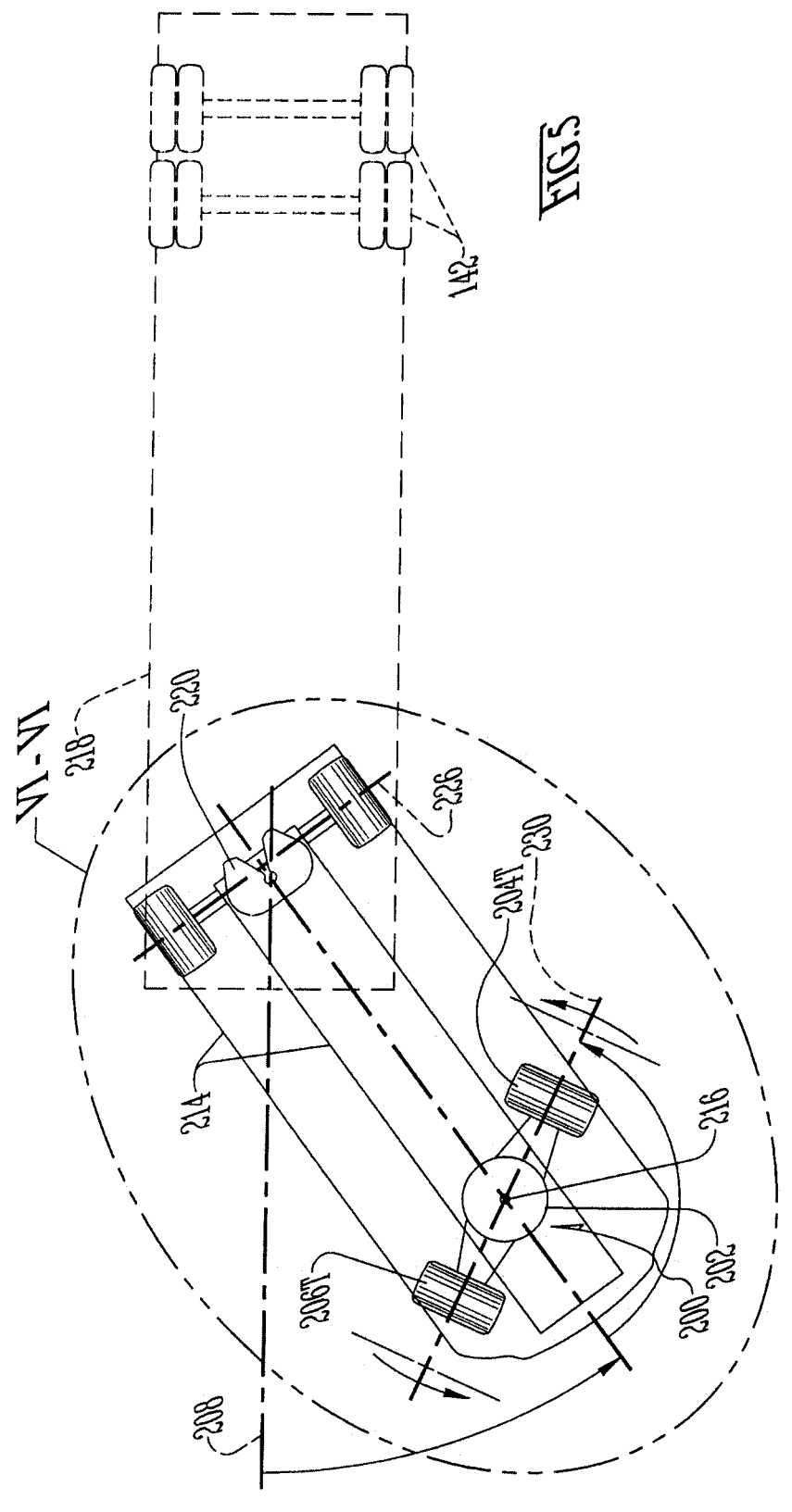
FIG. 5 is a schematic top plan view comparable to FIGS. 2A and 4 at showing the truck cab at an intermediate position between FIG. 2A and FIG. 4.

There are two independent electric drive motors 210 and 212. They drive independent drive shafts 234, and each terminates in a bearing wheel end 204 or 206 (or a geared wheel end). The rear axle 226 has disc brake wheel ends. FIGS. 1 and 3 show that the cab 214 has front air fairings and other streamline features.

FIG. 10 shows better the drive by wire elements, albeit one of the communications link is preferably wireless. FIG. 10 shows the helm of the cab 214 has an outer controller 222. The front axle/turntable 200 has an inner controller 224.

The outer controller 222 receives various drive inputs like steering wheel 236 steering, accelerator pedal 238 acceleration, brake pedal 242 braking, and gear selector 244 selection.

The outer controller 22 communicates wirelessly with the inner controller 224. That way, the only utility that need be run to the front axle/turntable 200 is electric power. The received electric power can be converted into drive power for the electric motors 210 and 212, and converted into power supply power for the inner controller 224 and its control signals sent by wire within the front axle/turntable drive/suspension package 200. The received electric power can even power pneumatic compressors (this is not shown) so that the supply of a pneumatic pressure source is all onboard the front axle/turntable 200 and does not require pneumatic line connections with the truck cab 214.

An example of wireless connections between the outer and inner controller 222 and 224 includes radio frequencies.

FIG. 7 provides an isometric view of the front axle/turntable front suspension 200 system in accordance with the invention with independent electric motor driven wheel ends 204 and 206 in accordance with the invention. There is an upper annular flange 202 serving as the turntable 202, an air spring 232, a sway bar 246, a wheel end disc brake, a lower suspension control arm 248, and a right-hand drive side (starboard side) electric drive motor 212 (the left-hand side is hidden from view).

FIG. 2B shows that this front axle/turntable 200 is able to execute various extreme maneuvers including a 'zero-cab-turn, pivot-in-place' maneuver at least through about a 90° pivot from a straight ahead heading. For example, left wheel end 204 is going to be accelerated smoothly to two miles per hour rearward (not forward) speed at the same time, in unison but independently, the right wheel end 206 is going to be accelerated smoothly to two miles per hour in forward speed. Thus, the left and right wheel ends 204 and 206 are being driven in exactly opposite directions. The following happens. The cab 214 does not move: —not forward, not backward; nor in a forward or backward turn. The turntable/front suspension assembly 200 pivots in place counterclockwise about its central vertical axis 216 (at least through about a 90° pivot from a straight ahead heading).

As noted above, it is an object of the present invention to replace Ackerman steering systems 120 with a turntable steering system 200 in accordance with the invention that has independent driven wheels/tires 204T and 206T on each side to accomplish steering. To turn to FIG. 7, the turntable 202 can be connected to the axle 230 by connecting it rigidly (not shown), or to a suspension and axle (the next option is what is actually shown), or else to an independent arm type suspension and spindle structure 230 and 232 for wheel ends 204 and 206.

The turntable steering system 200 in accordance with the invention connects a front driven axle 230 of a vehicle frame 214 to a movable turntable 202 with independent electric drive motors 210 and 212. The motor driven means of this front axle 200 is independent side to side so that each side can be controlled separately. Powering both electric motors 210 and 212 forward (not rearward) causes the vehicle 214 to move forward in a straight line 208 and the turntable 202 will not be rotating as the moments on the turntable 202 are the same side to side. The same outcome applies (ie., turntable 202 will not rotate) in the reverse mode as well for straight line reverse travel (~ 208).

To make a right hand turn, the left drive motor 210 is energized more than the right drive motor 212 to induce a moment on the turntable 202 to initiate a turn to the right. When the vehicle 214 is into the curve, the energization on the left motor 210 can be decreased as the vehicle 214 proceeds through the turn but the left side motor 210 will still need to turn faster than the right side (turn side) motor 212. That is because, the left side wheels/tires 204T will be turning through a larger turn radius and, to keep pace with the right side wheels/tires 206T, the left side wheels/tires 204T will need to be turning faster to eliminate side-slip.

The steering is "active" by virtue of the differential energization levels to the left and right side, independent drive motors 210 and 212. However, the degree of angular pivoting of the turntable 202 is wholly "passive." That is, the degree of angular pivoting of the turntable 202 is passively responsive to the moment on it imposed by the differential energization levels to the left and right side, independent drive motors 210 and 212. The foregoing has the affect on the tires 204T and 206T to reduce tire wear, increase traction through the turn as the tires 204T and 206T are not slipping, and to increase vehicle stability as the tires 204T and 206T do not slip and maintain constant traction to the road surface pulling the vehicle 214 through the turn with the driven wheel steering 200, rather than pushing it through the turn with Ackerman steering 120. This functionality works the same way regardless whether turning left of right.

It is an aspect of the driven wheel steering 200 in accordance with the invention to obtain wheel cut angles (cramp angles) not possible with conventional Ackerman steering 120. But to get to cramp angles of 60° (even 90°, see FIG. 2B), there will be required modifications to current vehicle 214 frame design.

These modifications would require the vehicle 214 frame to get narrower than currently produced so as to support the front axle turntable 202 but to not interfere with the tires 204T and 206T as the turntable 202 allows up to a 60° degree cramp angle (or up to a 90° degree cramp angle). The vehicle 214 frame would need to go over the top of the tires 204T and 206T and also allow for up jounce of the suspension 232 so that the tires 204T and 206T would not contact the vehicle 214 frame. If the operator should want to perform a jack-knifing swinging turn to the right (eg., FIG. 3) in a tight maneuver, the operator can energize the wheel/tire 204T on the left side with the left side drive motor 210 while keeping the right side wheel/tire 206T stationary, causing a moment on the turntable 202 and the front steering axle assembly 200 to turn sharply to the right (and vice versa for left hand jackknife).

This jackknife maneuver may be needed occasionally but will cause tire side-slip wear on the inside non-moving tire. If the operator energizes a slight reverse motion on the inside tire during a jackknife turn, with forward motion of the outside tire of the jackknife turn, the operator can reduce side-slip and tire wear on the inside tire of the jackknife. As soon as the turntable 202 under the vehicle 214 frame has turned into position, the operator can energize both wheels/tires 204T and 206T to go forward, eliminating side-slip entirely for a jackknife turn.

It is an aspect of the invention that driven wheel steering 200 allows the tire patch size to be increased at the most important connection to the road surface, the tire steering patch. Because driven wheel steering 200 does not require steering mechanisms and gears that go through a 40:1 ratio from the steering wheel to the tire patch, the frictional force at the tire patch to steer a vehicle is greatly reduced. This is what allows a great increase to the tire patch size. Standard dual drive axle tires can be put on this driven wheel steering front axle suspension 200. An even better way to reduce rolling resistance of the tires and increase efficiency of the power, the sidewalls of the tires can be reduced from eight with duals, to four with large wide-base tires that have proven effective in reducing rolling resistance and reducing overall tire weight.

The ability to use standard drive axle tires allows cost-effective use of larger capacity tires at a front steering axle configuration 200. This further allows a furthermore cost-effective way to get to 20,000 pounds capacity on the driven front steer axle 230. Also, with electric motor driven wheel steering simplification of steering, the steering means automatically becomes a cost effective steer-by-wire system 222 and 224 compared to trying to turn a mechanical system of Ackerman steering 120 into a steer-by-wire system with use of extra motors to crank on levers.

When using the driven wheel steering front suspension 200 in accordance with the invention, more clearance space under and within the vehicle 214 frame and the front wheel well area will be required than with Ackerman steering 120. But with electric motors 210 and 212, this space that was used for combustion engine can now be used for the driven wheel steering system 200. This extra space can be used to accommodate air fairings seen on conventional vehicles to reduce the air resistance. This driven wheel steering function 200 can be used for semi-truck, day truck, or regular vehicle. Driven wheel steering 200 can be used in a 4×2 configuration, 4×4 configuration (or other configuration). By putting the driven wheel steering 200 up-front, a dead axle 226 can be used for a 4×2 configuration of a straight truck where the dead axle 226 is on a slide and can move up to allow for the tail to touch the ground acting like a rear ramp (eg., the trailer axles 142 are on such slides, see FIGS. 14A and 14B, as referred to here for the dead axle 226).

The rolling resistance of tires 204T and 206T has an especially adverse impact on fuel consumption, especially important for class 7 vehicles and up. Driven wheel steering 200 in accordance with the invention would allow the market to load the front steering axle 230 to 20,000 pounds to reduce the load requirements on the other axles 226 and 142. Putting 20,000 pounds on the front steering axle 232 and in combination of axle spacing the semi-truck and trailer combination 214 and 218 can be optimized so that the full vehicle weight capacity pursuant to the Federal Bridge Gross Weight Formula Rule (FBGWF Rule) of 80,000 pounds GVWR can be achieved by spacing and location of axles 230, 226, 142 of the vehicle 214,218.

FIG. 11 shows a standard five axle semi-truck and trailer rig. The current market normal combination is for a three axle semi-truck with two rear drive axles and one front steering axle spanning twenty feet and carrying 46,000 pounds.

Pursuant to the Federal Bridge Gross Weight Formula Rule (FBGWF Rule), it is possible to get to 51,000 pounds in a twenty foot span with three axles, or, 40,000 pounds with two axles in a ten to twenty foot span. The two axle combination is more effective use of axle and tire weight where it is possible to carry 20,000 pounds per each axle.

With a two axle combination (FIG. 12 or 13), the rear axle of the vehicle can be driven or dead axle. A heavy loading semi-trailer that needs the driven capacity may need both axles to be driven. Whereas a daily driver semi-trailer that does not have a sleeper cab and pulls a lighter loaded trailer may not need both axles on the truck to be driven. That way, the back axle can be a dead trailing axle that can carry 20,000 pounds and reduce the overall cost of the vehicle.

With the goal of FIG. 13 in mind (ie., to get to the full 80,000 pounds GVWR in four axles), owner-operators can start by spreading the front two axles by a minimum of ten feet apart to allow 40,000 pounds on that two axle group (20,000 pounds per axle). But most current semi-truck and trailer are five axle vehicles (eg., FIG. 11) with the back two trailer axles at a four foot spread. To turn to FIG. 12, the current back two axle group at foot spread only allows 34,000 pounds on that back tandem pursuant to the Federal Bridge Gross Weight Formula Rule (FBGWF Rule). This combination is viable but only allows a full GVWR of 74,000 pounds pursuant to the Federal Bridge Gross Weight Formula Rule (FBGWF Rule) at an overall length (OAL) of fifty-seven feet.

This configuration (FIG. 12) of a semi-truck & trailer rig would be sufficient for 70% of current requirements. But sometimes the carriers need to be able to carry the full 80K GVWR for a load.

In this case, see FIGS. 14A and 14B, showing a flexible spread-adjusting sliding independent bogie system 250 in accordance with the invention for splitting apart independent sliding bogies 252A and 252B and for rear trailer axles 142A and 142B. With a properly configured and outfitted trailer 218 with independent sliding bogies 252A and 252B, the owner-operator could split the rear trailer axles 142A and 142B and slide the front rear axle 142A to a position that is ten feet in front of the rearmost rear axle 142B to allow 20,000 pounds loading on each rear axle bogie 252A and 252B. Current configurations for ten feet spread rear axles usually are full length subframe with the axles rigidly mounted at the ten feet spread. The flexible spread-adjusting sliding independent bogie system 250 in accordance with the invention is low weight and versatile as the axles 142A and 142B can be split or re-grouped together anywhere on the trailer 218 undercarriage rail system. The flexible spread-adjusting sliding independent bogie system 250 in accordance with the invention can be adapted with air ride suspensions, or split mechanical suspension systems to reduce weight.

Rolling resistance of tires accounts for up to 30% of a vehicle's fuel consumption. Reducing one axle on a five axle semi-truck-trailer rig (eg., going from FIG. 11 to either of FIG. 12 or 13) will reduce 20% of the tires to improve fuel consumption 6%. But having extra tires to the ground facilitates truck drivers to more easily avoid being overweight with their vehicle at any one axle set. So, reducing an axle set may require a means for drivers to manipulate axles as shown by FIGS. 14A and 14B with a flexible spread-adjusting sliding independent bogie system 250 in accordance with the invention, so that weight distribution can be accommodated with sliding forward rear axle 142A of the rear axle set 142A and 142B, and/or by a sliding adjustable fifth wheel 220 on the rear frame of the semi-truck cab 214 (which connects to the trailer king pin).

The electric motors 210 and 212 could be replaced by hydraulic motors (not shown), but unless the hydraulic motors were electrically driven on the front-wheel drive front axle/turntable package 200, then that would entail running hydraulic lines from the cab 214 to the front-wheel drive front axle/turntable package 200.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method of driving and steering a front-wheel drive electric-motor drive commercial motor ("CMV"): comprising the steps of:
   providing a front-wheel drive electric-motor drive CMV with a cab;
   providing the cab with a front axle/turntable that has left and right independent electric motor driven wheel ends;
   further providing the cab with air fairings to house the front axle/turntable and reduce air resistance,
   energizing the left and right independent electric motor driven ends cooperatively or differentially;
   whereby the steering is "active" by virtue of the differential energization levels to the left and right side, independent drive motors, while the degree of angular pivoting of the turntable is wholly "passive" in that the degree of angular pivoting of the turntable is passively responsive to moment on it imposed by the differential energization levels to the left and right side, independent drive motors;
   providing a semi-trailer; and adapting the cab to tow the semi-trailer; and
   providing the cab with a rear axle and spaced left and right rear tires; and
   providing the cab with a frame connecting the front axle/turntable with the rear axle;
   providing the semi-trailer with an undercarriage; and
   providing the cab frame with a fifth wheel as well as providing the semi-trailer undercarriage with a king pin whereby the fifth wheel releasably latches the king pin; and driving and steering the cab while the trailer is parked in a controlled jack-knife maneuver wherein the cab pivots about the fifth wheel and king pin while the trailer remains motionless.

2. The method of claim 1, further comprising the steps of:
   accelerating the left wheel end smoothly to a rearward (not forward) speed;
   at the same time, in unison with but independently of the left wheel end, accelerating the right wheel end smoothly to an equal but forward (not rearward) speed;
   whereby the left and right wheel ends are being driven in exactly opposite directions at the same speeds and, while the vehicle does not move, the front axle/turntable does execute a 'zero-vehicle-turn, pivot-in-place' maneuver at least through about a 90° counterclockwise pivot from a straight ahead heading.

3. The method of claim 1, further comprising the steps of:
   accelerating the right wheel end smoothly to a rearward (not forward) speed;
   at the same time, in unison with but independently of the right wheel end, accelerating the left wheel end smoothly to an equal but forward (not rearward) speed;
   whereby the left and right wheel ends are being driven in exactly opposite directions at the same speeds and, while the vehicle does not move, the front axle/turntable does execute a 'zero-vehicle-turn, pivot-in-place' maneuver at least through about a 90° clockwise pivot from a straight ahead heading.

4. The method of claim 1, wherein: the cab's rear axle can be dead or driven.

5. The method of claim 1, wherein: the cab's rear axle is driven.

6. A method of driving and steering a front-wheel drive electric-motor drive commercial motor vehicle ("CMV"); comprising the steps of:
   providing a front-wheel drive electric-motor drive CMV with a cab;
   providing a front-wheel drive electric-motor drive CMV with a van or trailer;
   providing the cab with a front axle/turntable that has left and right independent electric motor driven wheel ends;
   further providing the cab with air fairings to house the front axle/turntable and reduce air resistance,
   energizing the left and right independent electric motor driven ends cooperatively or differentially;
   whereby the steering is "active" by virtue of the differential energization levels to the left and right side, independent drive motors, while the degree of angular pivoting of the turntable is wholly "passive" in that the degree of angular pivoting of the turntable is passively responsive to moment on it imposed by the differential energization levels to the left and right side, independent drive motors;
   wherein translation of the cab can be performed without resulting in translation of the van or trailer;
   providing the cab with a rear axle and spaced left and right rear tires; and
   providing the cab with a frame connecting the front axle/turntable with the rear axle;
   providing the semi-trailer with an undercarriage; and
   providing the cab frame with a fifth wheel as well as providing the semi-trailer undercarriage with a king pin whereby the fifth wheel releasably latches the king pin; and driving and steering the cab while the trailer is parked in a controlled jack-knife maneuver wherein the cab pivots about the fifth wheel and king pin while the trailer remains motionless.

7. The method of claim 6, further comprising the steps of: if:

accelerating the left wheel end smoothly to a rearward (not forward) speed;

at the same time, in unison with but independently of the left wheel end, accelerating the right wheel end smoothly to an equal but forward (not rearward) speed;

whereby the left and right wheel ends are being driven in exactly opposite directions at the same speeds and, while the vehicle does not move, the front axle/turntable does execute a 'zero-vehicle-turn, pivot-in-place' maneuver at least through about a 90° counterclockwise pivot from a straight ahead heading;

or if:

accelerating the right wheel end smoothly to a rearward (not forward) speed;

at the same time, in unison with but independently of the right wheel end, accelerating the left wheel end smoothly to an equal but forward (not rearward) speed;

whereby the left and right wheel ends are being driven in exactly opposite directions at the same speeds and, while the vehicle does not move, the front axle/turntable does execute a 'zero-vehicle-turn, pivot-in-place' maneuver at least through about a 90° clockwise pivot from a straight ahead heading.

8. The method of claim 7, further comprising the step(s) of:

providing the CMV with a rear axle and spaced left and right rear tires;

wherein the CMV's rear axle is driven.

\* \* \* \* \*